US010591611B2

(12) United States Patent
Martin et al.

(10) Patent No.: US 10,591,611 B2
(45) Date of Patent: Mar. 17, 2020

(54) METHOD FOR DETERMINING A WRONG SYNCHRONIZATION OF A RECEIVER WITH A SATELLITE, ASSOCIATED RECEIVER AND COMPUTER PROGRAM PRODUCT

(71) Applicant: THALES AVIONICS, Valence (FR)

(72) Inventors: Nicolas Martin, Valence (FR); Denis Bouvet, Valence (FR)

(73) Assignee: Thales, Courbevoie (FR)

( * ) Notice: Subject to any disclaimer, the term of this patent is extended or adjusted under 35 U.S.C. 154(b) by 345 days.

(21) Appl. No.: 15/427,595

(22) Filed: Feb. 8, 2017

(65) Prior Publication Data
US 2017/0227652 A1    Aug. 10, 2017

(30) Foreign Application Priority Data

Feb. 9, 2016 (FR) ..................................... 16 00214

(51) Int. Cl.
*G01S 19/30*    (2010.01)
*G01S 19/21*    (2010.01)

(52) U.S. Cl.
CPC .............. *G01S 19/30* (2013.01); *G01S 19/21* (2013.01)

(58) Field of Classification Search
CPC ..................................................... G01S 19/23
USPC ...................................................... 342/357
See application file for complete search history.

(56) References Cited

U.S. PATENT DOCUMENTS

| 2005/0270997 | A1* | 12/2005 | Julien | G01S 19/30 |
| | | | | 370/315 |
| 2006/0039453 | A1* | 2/2006 | Yamada | H04B 1/7085 |
| | | | | 375/150 |
| 2010/0117884 | A1 | 5/2010 | Ahmed et al. | |
| 2011/0254732 | A1* | 10/2011 | Martin | G01S 19/30 |
| | | | | 342/357.59 |

FOREIGN PATENT DOCUMENTS

| EP | 2 818 893 A1 | 12/2014 |
| WO | WO 2010/098465 A1 | 9/2010 |

OTHER PUBLICATIONS

Hyun, Choi, et al, "Acquisition and Tracking Schemes for a GPS L5 Receiver," Oct. 2008, International Conference on Control, Automation and Systems (Year: 2008).*

(Continued)

*Primary Examiner* — Gregory C. Issing
(74) *Attorney, Agent, or Firm* — Duane Morris LLP

(57) ABSTRACT

A method for determining a wrong synchronization of a receiver with a satellite, associated receiver and computer program product, is implemented after the acquisition phase and includes the following steps:
generating first and second test signals;
for each correlation interval, determining a first prompt correlator corresponding to the correlation value between the received signal and the first test signal, and a second prompt correlator corresponding to the correlation value between the received signal and the second test signal;
determining first and second energy values corresponding to the energy of the first and second correlators, respectively;
determining a wrong synchronization indicator based on the difference between the first and second energy values; and
detecting a wrong synchronization based on this indicator.

9 Claims, 5 Drawing Sheets

(56) References Cited

OTHER PUBLICATIONS

Ward, Phillip, et al., "Understanding GPS", Nov. 2005 (Year: 2005).*

Shanmugam, et al.; "GPS L5 Cross-correlation Detection in WAAS G-III Reference Receiver"; Proceedings of the 25th Intl Tech. Meeting of the Satellite Div., Sep. 21, 2012; 1369-1376.

French Search Report dated Aug. 9, 2016.

* cited by examiner

METHOD FOR DETERMINING A WRONG SYNCHRONIZATION OF A RECEIVER WITH A SATELLITE, ASSOCIATED RECEIVER AND COMPUTER PROGRAM PRODUCT

RELATED APPLICATIONS

The present application claims priority benefit of French Application No. FR 16 00214 filed on Feb. 9, 2016, the contents of which are incorporated by reference in its entirety.

FIELD OF THE INVENTION

The present invention relates to a method for determining a wrong synchronization of a receiver with a satellite during a phase for acquiring a navigation signal coming from this satellite.

Such a satellite is part of a global navigation satellite system (GNSS).

BACKGROUND OF THE INVENTION

In general, a GNSS system is made up of a plurality of satellites allowing a mobile receiver to determine its position in a land-based plane of reference, its speed and the time.

There are currently several GNSS systems, which in particular include the GPS system, the GLONASS system and the GALILEO system, which is expected to be brought online soon.

The satellites of such a GNSS system are able to emit electromagnetic signals in particular comprising navigation information.

Each item of navigation information generally comprises data relative to the transmission time by the satellite of the corresponding signal and the current position of the satellite. In particular, the data relative to the current position of the satellite generally contain the almanac providing a rough position of the satellite and the ephemerids giving the exact current position of the satellite.

The item of navigation information is carried by a carrier wave and modulated by a spreading code specific to each satellite. Thus, the signals are transmitted by the satellites using a spread spectrum technique.

The receiver is able to receive the signals emitted by the satellites and to extract the navigation information therefrom in particular to determine the distance to the satellite that transmitted the corresponding signal. This distance, also called pseudo-distance, is determined by analyzing the propagation delay of the corresponding signal.

To determine its position, its speed and the time, the receiver performs a digital processing of the navigation information from at least three different satellites.

In practice, to have a more precise position, the receiver needs navigation information from at least four different satellites.

More specifically, to acquire the navigation information from a given satellite, the receiver implements two phases processing the signals from this satellite.

During an initial phase, called acquisition phase in the state of the art, the receiver generates a local signal in particular containing a local spreading code showing the image of the spreading code of the satellite.

Since the receiver does not initially know its position, the local signal is not synchronized with the received signal. This in particular means that the local signal is carrier frequency-shifted from the received signal by a value called Doppler value, and the spreading code of the received signal is delayed from the local spreading code by a value called delay value.

The receiver then searches for a peak in the correlations between the local signal and the received signal by trying different Doppler and delay values.

When a peak is detected, the receiver determines the Doppler and delay values corresponding to this peak and, from these values, launches a following phase, called tracking phase in the state of the art.

During the tracking phase, the receiver regularly updates the Doppler and delay values, and extracts the item of navigation information from the signal transmitted by the satellite in particular using the local spreading code and the determined Doppler and delay values.

At the end of the acquisition phase, the receiver is considered to have synchronized itself with the satellite, or has "locked on" to the satellite.

This in particular means that the receiver was able to find the Doppler and delay values relative to this satellite to initiate the tracking phase.

Sometimes, the receiver synchronizes its local signal corresponding to the desired satellite with the signal received from another satellite, which leads to an erroneous distance measurement, and therefore potentially a wrong position.

In this case, this is a wrong synchronization, or a false "lock".

This for example occurs when the correlation between the local signal and the signal received from the sought satellite provides less energy than the correlation with the signal received from another satellite, due to a large received power deviation.

Different methods exist in the state of the art making it possible to avoid such a wrong synchronization.

Thus, one method, used conventionally, consists of verifying the consistency between the position of the satellite computed from ephemerids contained in the item of navigation information and that computed from the almanac, containing the identifiers of the satellites, unlike the ephemerids. An inconsistency between these values therefore indicates a wrong synchronization.

However, this method is not completely satisfactory. In particular, it requires collecting all of the ephemerids contained in the navigation information, which is relatively time-consuming. In practice, this may take up to two minutes.

One can then see that this is detrimental to the operation of the receiver, in particular after the satellite is hidden, and does not make it possible to ensure continuous service.

SUMMARY OF THE INVENTION

The present invention aims to resolve this drawback.

To that end, the invention relates to a method for detecting a wrong synchronization of a receiver with a satellite during a phase for acquiring a navigation signal from this satellite, the satellite being part of a global navigation satellite system, the navigation signal being of the simple or complex type; the signal of each type comprising a data channel including an item of navigation information modulated by a data spreading code specific to this satellite and carried by a carrier wave. The complex-type signal further comprising a pilot channel including a pilot spreading code specific to this satellite and carried by a carrier wave; during the acquisition phase, the receiver being able to receive the navigation signal transmitted by the satellite, to generate a local image of the data spreading code and a local image of the carrier wave for a simple or complex signal, and further to generate a local image of the pilot spreading code for a complex signal.

The method is implemented after the acquisition phase during a convergence phase and comprising the following steps:

generating a first test signal comprising the local image of the carrier wave and a first test spreading code, and a second test signal comprising the local image of the carrier wave and a second test spreading code; for a simple signal, the first and second test spreading codes being codes whose sum corresponds to the local image of the data spreading code; for a complex signal, the first and second test spreading codes corresponding to the local images of the data spreading code and the pilot spreading code, respectively;

for each correlation interval of a plurality of correlation intervals, defining a first prompt correlator corresponding to the correlation value between the received signal and the first test signal, and a second prompt correlator corresponding to the correlation value between the received signal and the second test signal;

determining first and second energy values corresponding to the energy of the first and second correlators, respectively, over all of the correlation intervals;

determining a wrong synchronization indicator based on the difference between the first and second energy values;

detecting a wrong synchronization when the wrong synchronization indicator is above a predetermined threshold.

According to other advantageous aspects of the invention, the detection method comprises one or more of the following features, considered alone or according to all technically possible combinations:

the wrong synchronization indicator is determined using the following expression:

$$Ind = \frac{|E_2 - E_1|}{E_2 + E_1},$$

where $E_1$ is the first energy value; and
$E_2$ is the second energy value;

the first energy value corresponds to the sum of the squares of norms of the first correlators over all of the correlation intervals, and the second energy value corresponds to the sum of the squares of norms of the second correlators over all of the correlation intervals;

the first and second test spreading codes are decorrelated;

the local image of the data spreading code and the first and second test spreading codes each define a code period formed by a plurality of chips, each chip assuming a value of a discretized state from among a set of discrete states, one of these states, called zero state, corresponding to the zero value of this code;

for a simple-type signal, the period of the first test spreading code is made up of even chips of the local image of the data spreading code, each pair of said chips being spaced apart by a chip whose discretized state corresponds to the zero state; and the period of the second test spreading code is formed by odd chips of the local image of the data spreading code, each pair of said chips being spaced apart by a chip whose discretized state corresponds to the zero state; and for a simple-type signal, the first half of the period of the first test spreading code is made up of corresponding chips of the local image of the data spreading code, and the second half is made up of chips whose discretized state corresponds to the zero state and the first half of the period of the second test spreading code is made up of chips whose discretized state corresponds to the zero state, and the second half is made up of chips corresponding to the local image of the data spreading code.

The invention also relates to a computer program product including software instructions which, when implemented by computer equipment, carry out a method as defined above.

The invention also relates to a receiver carrying out the method as previously defined.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

In the rest of the description, the expression "substantially equal to" refers to an equality relationship to within plus or minus 10%.

Figure 1:
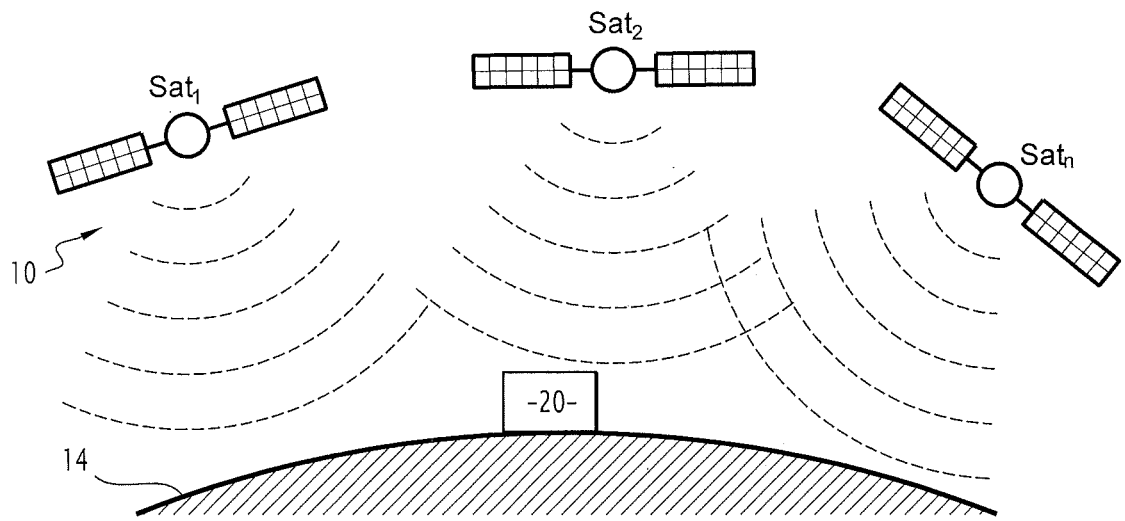
FIG. 1 is a schematic view of a global navigation satellite system and a receiver according to the invention.

FIG. 1 shows a global navigation satellite system (GNSS) 10.

In reference to this FIG. 1, the positioning system 10 includes a plurality of satellites $Sat_n$ positioned in different orbits around the Earth for which the positioning system 10 is established.

The total number of satellites $Sat_n$ is for example equal to 30.

The index n corresponds to an identifier of each satellite $Sat_n$, and for example varies between 1 and 30.

Each satellite $Sat_n$ is able to transmit electromagnetic signals S toward part of the Earth's surface 14 that it is flying over.

In particular, the satellites $Sat_n$ are arranged such that at least four satellites $Sat_n$ are able to transmit electromagnetic navigation signals S toward substantially each point of the Earth's surface 14.

The current position of each satellite $Sat_n$ is characterized by the ephemerids relative to this satellite or by the almanac thereof.

As is known in itself, the ephemerids make it possible to determine the exact position of the satellite $Sat_n$, while the almanac provides a rough position.

Each signal S transmitted by each of the satellites $Sat_n$ comprises a data channel including an item of navigation information.

In particular, such a signal S comprises navigation information modulated by a data spreading code $C_n^d(\phi_c)$ specific to the satellite $Sat_n$ having transmitted this signal.

The modulated navigation information is carried by a carrier wave $\exp(-j\phi_p)$ using a technique known in itself.

A signal S comprising only one data channel is hereinafter referred to as a "simple signal".

The signal S transmitted by at least some of the satellites $Sat_n$ further comprises a pilot channel including a pilot spreading code $C_n^p(\phi_c)$ specific to the satellite $Sat_n$ having transmitted this signal.

Such a signal S further comprising a pilot channel is hereinafter referred to as a "complex signal".

Each item of navigation information in particular comprises the transmission time of the corresponding signal, the ephemerids and the almanac of the satellite $Sat_n$ at the time of transmission of the signal S.

Each data $C_n^d(\phi_c)$ or pilot $C_n^p(\phi_c)$ spreading code has a binary code of the pseudorandom noise (PRN) type.

Each data $C_n^d(\phi_c)$ or pilot $C_n^p(\phi_c)$ spreading code is a periodic code with a code period denoted $L_c$ and expressed as a whole number of reference units.

The reference unit is for example a chip whose duration is denoted $T_{chip}$ and expressed in seconds.

A "chip" refers to a reference unit corresponding to a slot of a pseudorandom noise-type code.

Each chip assumes a value of a discretized state from among a set of discretized states, one of these states, called zero state, corresponding to the zero value of this code.

The data $C_n^d(\phi_c)$ or pilot $C_n^p(\phi_c)$ spreading codes are characterized by their autocorrelation functions $R_{n,n}$ respectively determined using the following formulas:

$$R_{n,n}(\tau) = \frac{1}{L_c}\int_0^{L_c} C_n^d(u) C_n^d(u+\tau) du,$$

$$R_{n,n}(\tau) = \frac{1}{L_c}\int_0^{L_c} C_n^p(u) C_n^p(u+\tau) du.$$

In particular, at point $\tau=0$, called reference point, the autocorrelation function $R_{n,n}$ assumes its maximum value $V_{max}$. For $\tau \leq -T_{chip}$ and $\tau \geq T_{chip}$, the autocorrelation function $R_{n,n}$ assumes very small values V in view of $V_{max}$, i.e., $V \ll V_{max}$.

Figure 2:
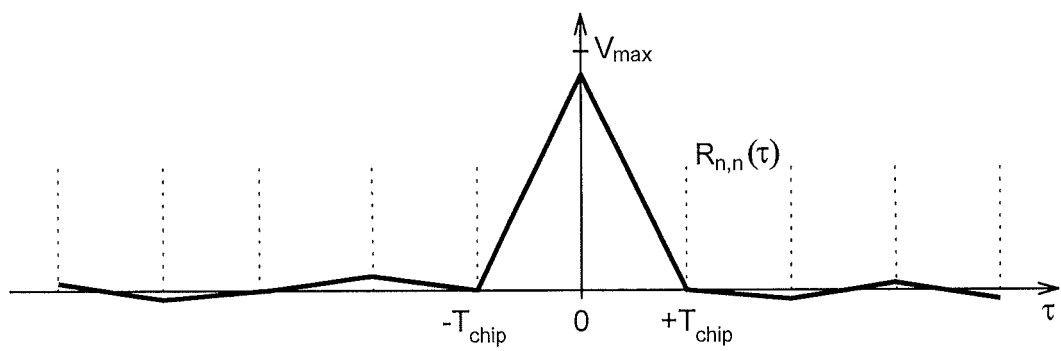
FIG. 2 is a schematic view of an autocorrelation function used during the operation of the system of FIG. 1.

One example of such an autocorrelation function $R_{n,n}$ of a data spreading code $C_n^d(\phi_c)$ is illustrated schematically in FIG. 2.

The data $C_n^d(\phi_c)$ or pilot $C_n^p(\phi_c)$ spreading codes corresponding to the different satellites $Sat_n$ are quasi-perpendicular. In other words, the inter-correlation function $R_{n,j}$ between each pair of different spreading codes $C_n^d(\phi_c)$ and $C_i^d(\phi_c)$ or $C_n^p(\phi_c)$ and $C_i^p(\phi_c)$ assumes negligible values V in view of $V_{max}$, the inter-correlation functions $R_{n,j}$ for these codes respectively being determined by the following formulas:

$$R_{n,j}(\tau) = \frac{1}{L_c}\int_0^{L_c} C_n^d(u) C_j^d(u+\tau) du,$$

$$R_{n,j}(\tau) = \frac{1}{L_c}\int_0^{L_c} C_n^p(u) C_j^p(u+\tau) du.$$

Figure 3:
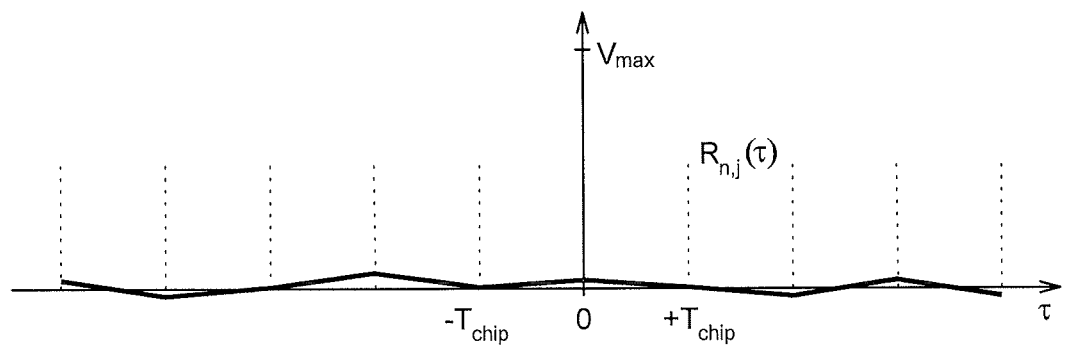
FIG. 3 is a schematic view of an inter-correlation function used during the operation of the system of FIG. 1.

One example of such an intercorrelation function $R_{n,j}$ for different data spreading codes $C_n^d(\phi_c)$ is illustrated schematically in FIG. 3.

Each data spreading code $C_n^d(\phi_c)$ makes it possible to modulate the navigation information transmitted by the satellite $Sat_n$.

When a satellite $Sat_n$ only transmits simple signals, these signals are demodulated using a local image $C_n^d(\phi_{cloc})$ of the data spreading code $C_n^d(\phi_c)$ corresponding to this satellite.

When a satellite $Sat_n$ transmits complex signals, each of the two signals is demodulated using a spreading code that is the local image $C_n^d(\phi_{cloc})$ of the data spreading code $C_n^d(\phi_c)$ or the local image $C_n^p(\phi_{cloc})$ of the pilot spreading code $C_n^p(\phi_c)$ corresponding to this satellite.

These signals are demodulated using different techniques for transmitting complex signals known in themselves.

Thus, for example, under the "TDMA (Time Division Multiple Access) Multiplexing" technique, the odd chips of the composite spreading code correspond to the corresponding data spreading code $C_n^d(\phi_c)$, and the even chips of the composite spreading code correspond to the corresponding pilot spreading code $C_n^p(\phi_c)$.

According to the "CDMA (Code Division Multiple Access) Multiplexing" technique, each complex signal is sent via two carrier waves at the same frequency and synchronously. In this case, the composite spreading code corresponds to the sum of the corresponding data $C_n^d(\phi_c)$ and pilot $C_n^p(\phi_c)$ spreading codes.

According to the example embodiment described below, the positioning system 10 is the GPS system (Global Positioning System).

Of course, other example embodiments are also possible.

The signals S transmitted by at least some of the satellites $Sat_n$ are received by a receiver 20.

The receiver 20 is for example a portable electronic device.

The receiver 20 is for example able to move on or near the Earth's surface 14 with a variable speed.

The receiver 20 is able to receive signals S from satellites $Sat_n$, and to extract the navigation information from these signals S to deduce its current position, its current speed and the time, as will be explained later.

Figure 4:
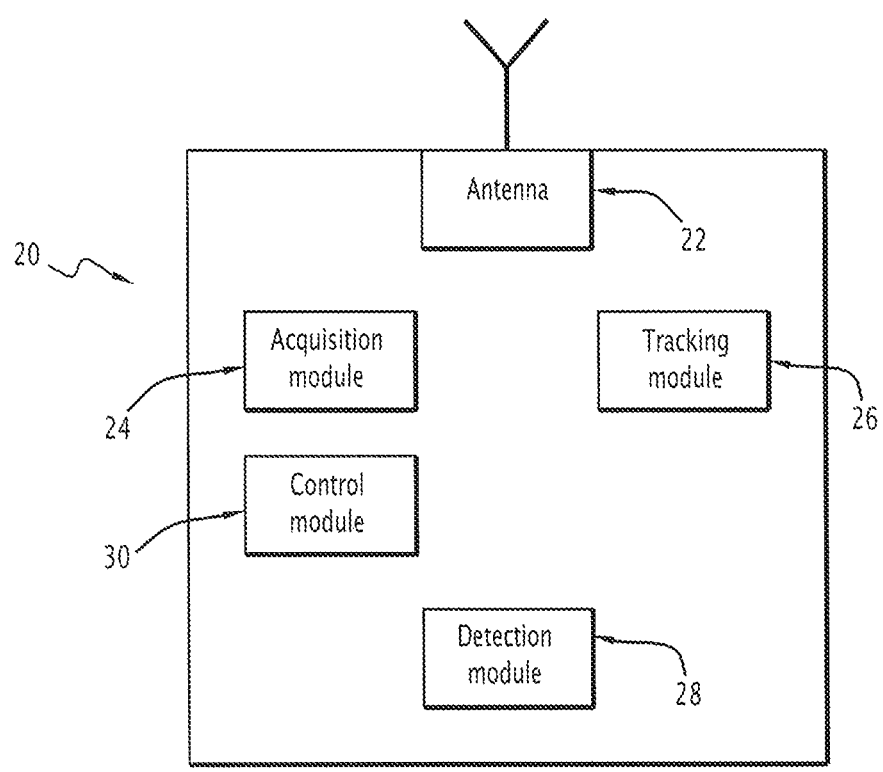
FIG. 4 is a detailed view of the receiver of FIG. 1.

The receiver 20 is illustrated in more detail in FIG. 4.

Thus, in reference to this FIG. 4, the receiver 20 includes an antenna 22, an acquisition module 24, a tracking module 26, a detection module 28 according to the invention, a control module 30 and hardware resources.

The modules 24, 26, 28 and 30 for example assume the form of software programs that are implemented by the hardware resources provided to that end, such as a processor, random-access memory, read-only memory, etc. The hardware resources are for example battery-powered.

In particular, the read-only memory of the receiver 20 is able to store images of the data $C_n^d(\phi_c)$, and optionally pilot $C_n^p(\phi_c)$, spreading codes of each satellite $Sat_n$.

The antenna 22 is able to receive electromagnetic signals $S_r$ corresponding to the signals S transmitted by the satellites $Sat_n$ when the latter are in range of its visibility.

The control module 30 is able to control the operation of the modules 24, 26 and 28.

The acquisition module 24 is able to carry out an acquisition phase for the signals $S_r$ using techniques known in themselves.

The tracking module 26 is able to carry out a tracking phase for the signals $S_r$ using techniques known in themselves.

Lastly, the detection module 28 is able to carry out a convergence phase, which is transitional between the acquisition phase and the tracking phase. The convergence phase in particular comprises a method 100 for detecting a wrong synchronization according to the invention. This method will be described in detail below.

The operation of the receiver 20 will now be explained.

Each time the receiver 20 is started, the control module 30 initiates a plurality of acquisition channels for all of the satellites $Sat_n$. Each of these channels makes it possible to acquire the item of navigation information from the satellite $Sat_n$ with which it is associated, when this satellite $Sat_n$ is in the visibility range of the antenna 22.

The operation of the receiver 20 on each acquisition channel is substantially similar. Thus, only the operation of the receiver 20 on one channel will be explained below.

This channel is for example associated with the satellite $Sat_n$, hereinafter called sought satellite. It is further assumed that the satellite $Sat_n$ is situated in the visibility range of the antenna 22 and that this satellite is able to transmit simple and complex signals.

For a simple signal, the receiver 20 generates a local data signal $S_{loc}^d$ including a local carrier wave $\exp(-j\phi_{ploc})$ and a local data spreading code $C_n^d(\phi_{cloc})$ corresponding to a local image of the data spreading code $C_n^d(\phi_c)$ of the sought satellite.

The local data signal $S_{loc}^d$ as a function of time t is then written in the following form:

$$S_{loc}^d(t) = \exp(-j\phi_{ploc}(t)) \cdot C_n^d(\phi_{cloc}(t)),$$

with $j^2 = -1$.

For a complex signal, the receiver 20 further generates a local pilot signal $S_{loc}^P$ including a local carrier wave $\exp(-j\varphi_{ploc})$ and a local pilot spreading code $C_n^P(\phi_{cloc})$ corresponding to a local image of the pilot spreading code $C_n^P(\phi_c)$ of the sought satellite.

Then, the control module 30 launches the execution of the acquisition phase, which is then carried out by the acquisition module 24.

In particular, during the acquisition phase, the acquisition module 24 determines a Doppler value and a delay value of the received signal $S_r$ relative to the local data $S_{loc}^d$ or pilot $S_{loc}^P$ signal.

The Doppler value corresponds to the frequency shift of the local carrier wave $\exp(-j\phi_{ploc})$ relative to the carrier wave $\exp(-j\phi_p)$ of the received signal $S_r$.

In the described example, for a simple signal, the delay value corresponds to the delay of the data spreading code $C_n^d(\phi_c)$ of this received signal relative to the local data spreading code $C_n^d(\phi_{cloc})$.

For a complex signal, the delay value corresponds to the delay of the pilot spreading code $C_n^P(\phi_c)$ of this received signal relative to the local pilot spreading code $C_n^P(\phi_{cloc})$.

In both cases, the delay values are determined using known techniques that in particular comprise computing three types of correlations.

A first type of correlation, called prompt correlation, consists of computing correlations between the received signal $S_r$ and the local data $S_{loc}^d$ or pilot $S_{loc}^P$ signal.

A second type of correlation, called advance correlation, consists of computing correlations between the received signal $S_r$ and a signal corresponding to the local data $S_{loc}^d$ or pilot $S_{loc}^P$ signal in which the local spreading code $C_n^d(\phi_{cloc}+d)$ or $C_n^P(\varphi_{cloc}+d)$ is shifted forward by a value d comprised between 0 and $T_{chip}$.

A third type of correlation, called delay correlation, consists of computing correlations between the received signal $S_r$ and a signal corresponding to the local data $S_{loc}^d$ or pilot $S_{loc}^P$ signal in which the local spreading code $C_n^d(\phi_{cloc}-d)$ or $C_n^P(\phi_{cloc}-d)$ is delay-shifted by the same value d.

At the end of the acquisition phase, the receiver 20 synchronizes the local data $S_{loc}^d$ or pilot $S_{loc}^P$ signal with the signal S transmitted by the sought satellite $Sat_n$ by using the determined Doppler and delay values.

Then, the control module 30 launches the execution of the convergence phase, and in particular of the method 100 for detecting a wrong synchronization. This method is in particular carried out by the detection module 28.

The convergence phase enslaves the delay value of the local spreading code $C_n^d(\phi_{cloc})$ or $C_n^P(\phi_{cloc})$ and the Doppler value of the local carrier wave $\exp(-j\phi_{ploc})$, on the received signal $S_r$, using code and carrier tracking loops, in particular owing to the three aforementioned types of correlation.

This transitional phase makes it possible to cause the local spreading code $C_n^d(\phi_{cloc})$ or $C_n^P(\phi_{cloc})$ and the local carrier wave $\exp(-j\phi_{ploc})$ to coincide precisely with the spreading code $C_n^d(\phi_c)$ or $C_n^P(\phi_c)$ and the carrier wave $\exp(-j\phi_p)$ of the received satellite signal $S_r$.

Furthermore, the detection method 100 carried out during this phase makes it possible to detect a wrong synchronization of the corresponding acquisition channel with a satellite $Sat_p$ other than the sought satellite $Sat_n$.

In particular, the detection method 100 optionally makes it possible to detect a wrong synchronization with a non-zero Doppler value by determining the inconsistency between the frequency of the local spreading code $C_n^d(\phi_{cloc})$ or $C_n^P(\phi_{cloc})$ and the frequency of the local carrier $\exp(-j\phi_{ploc})$.

If such a wrong synchronization is not detected, the detection method 100 makes it possible to detect a wrong synchronization with a zero Doppler value, as will be explained below.

In particular, when a wrong synchronization occurs, the Doppler and delay values determined by the acquisition module 24 correspond to the signal S transmitted by a satellite $Sat_p$ other than the sought satellite $Sat_n$.

One can then see that in this case, the signals $S_{loc}^d$ or $S_{loc}^P$ and S cannot be synchronized correctly. This is therefore a wrong synchronization and a false lock.

When the detection module 28 detects a wrong synchronization, the control module 30 launches the acquisition phase again.

When the detection module 28 does not detect a wrong synchronization, the control module 30 launches the tracking phase, which is then carried out by the tracking module 26.

In particular, during the tracking phase, the tracking module 26 regularly updates the Doppler and delay values, which allows it to demodulate the received signal $S_r$ and extract the corresponding item of navigation information therefrom. It subsequently sends this information to the control module 30.

Lastly, the control module 30 consolidates all of the information acquired by the set of acquisition channels and deduces the position of the receiver 20, its speed and the time therefrom.

Figure 5:
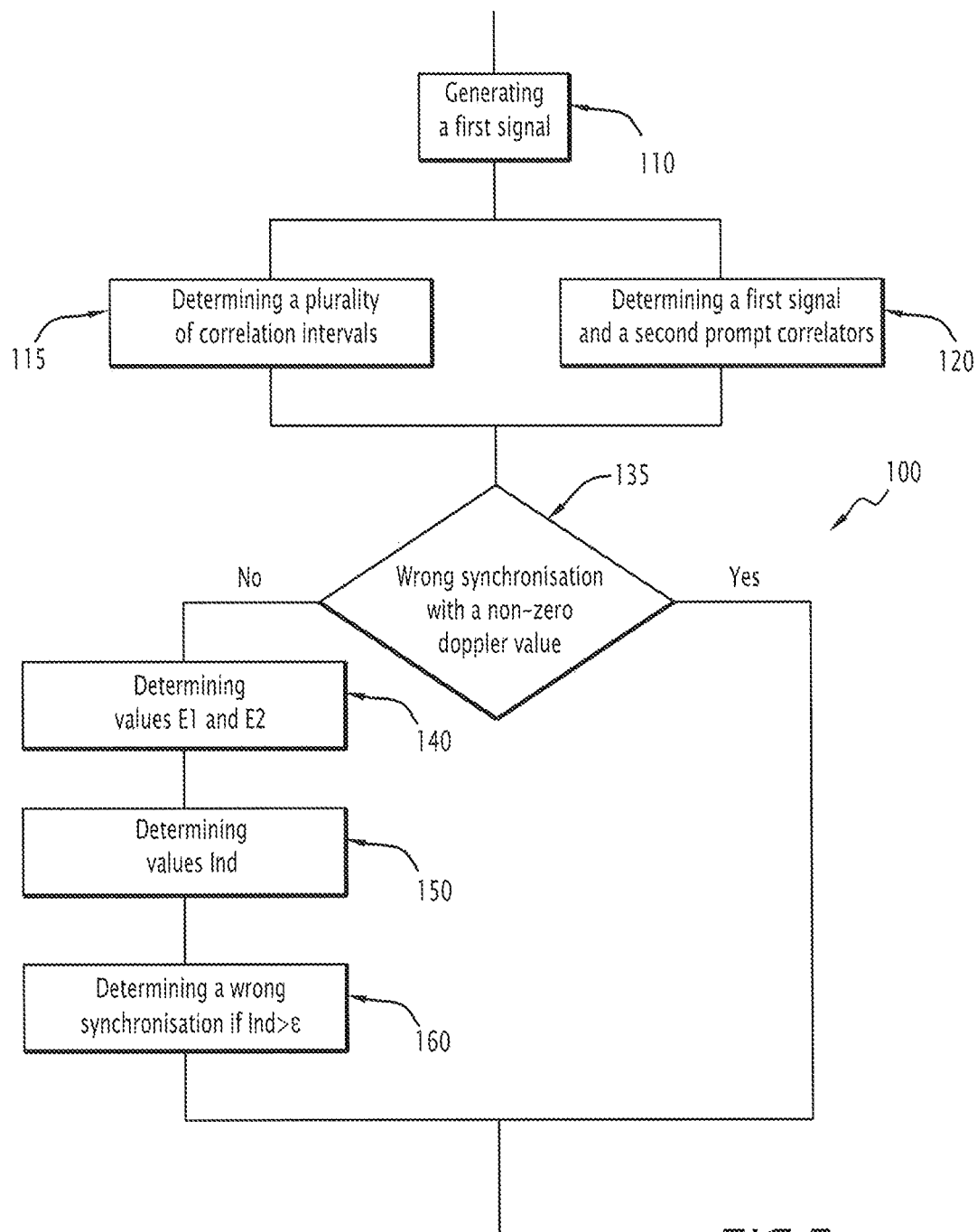
FIG. 5 is a flowchart of a detection method carried out by the receiver of FIG. 4.

The method for detecting a wrong synchronization will now be explained in detail in reference to FIG. 5, showing a flowchart of its steps.

During the initial step 110, the detection module 28 generates a first test signal $S_T^1$ and a second test signal $S_T^2$.

The first test signal $S_T^1$ comprises the local carrier wave $\exp(-j\phi_{ploc})$ and a first test spreading code $C_n^1(\phi_{cloc})$, and is determined according to the following relationship:

$$S_T^1(t) = \exp(-j\phi_{ploc}(t)) \cdot C_n^1(\phi_{cloc}(t)).$$

The second test signal $S^2$ comprises the local carrier wave $\exp(-j\phi_{ploc})$ and a second test spreading code $C_n^2(\phi_{cloc})$, and is determined according to the following relationship:

$$S_T^2(t) = \exp(-j\phi_{ploc}(t)) \cdot C_n^2(\phi_{cloc}(t)).$$

When the received signal $S_r$ is of the simple type, the first and second test spreading codes are decorrelated codes whose sum corresponds to the local data spreading code $C_n^d(\phi_{cloc})$, i.e.:

$$C_n^1(\phi_{cloc}) + C_n^2(\phi_{cloc}) = C_n^d(\phi_{cloc}).$$

According to one alternative embodiment, the period $L_c$ of the first test spreading code $C_n^1(\phi_{cloc})$ is made up of even chips of the local data spreading code $C_n^d(\phi_{cloc})$, each pair of said chips being spaced apart by a chip whose discretized state corresponds to the zero state.

According to the same alternative embodiment, the period $L_c$ of the second test spreading code $C_n^2(\phi_{cloc})$ is made up of odd chips of the local data spreading code $C_n^d(\phi_{cloc})$, each pair of said chips being spaced apart by a chip whose discretized state corresponds to the zero state.

Figure 6:
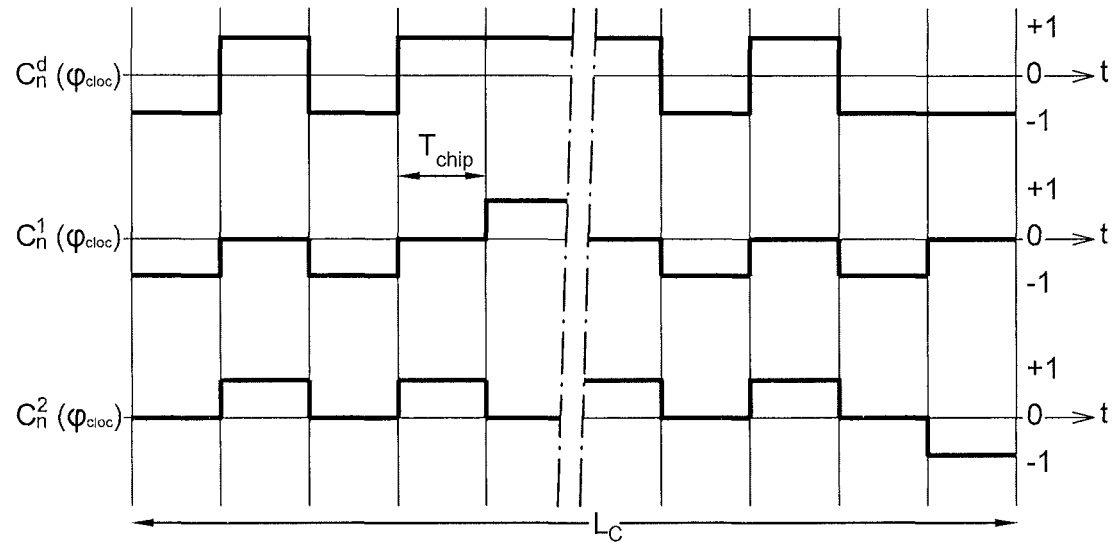
FIGS. 6 and 7 are schematic views illustrating spreading codes used during the implementation of the method of FIG. 5 for a simple signal.

One example of these three spreading codes $C_n^1(\phi_{cloc})$, $C_n^2(\phi_{cloc})$, $C_n^d(\phi_{cloc})$ is illustrated in FIG. 6.

According to another alternative embodiment, the first half of the period $L_c$ of the first test spreading code $C_n^1(\phi_{cloc})$ is made up of corresponding chips of the local data spreading code $C_n^d(\phi_{cloc})$, and the second half is made up of chips whose discretized state corresponds to the zero state.

According to the same alternative embodiment, the first half of the period $L_c$ of the second test spreading code $C_n^2(\phi_{cloc})$ is made up of chips whose discretized state corresponds to the zero state, and the second half is made up of corresponding chips of the local data spreading code $C_n^d(\phi_{cloc})$.

Figure 7:
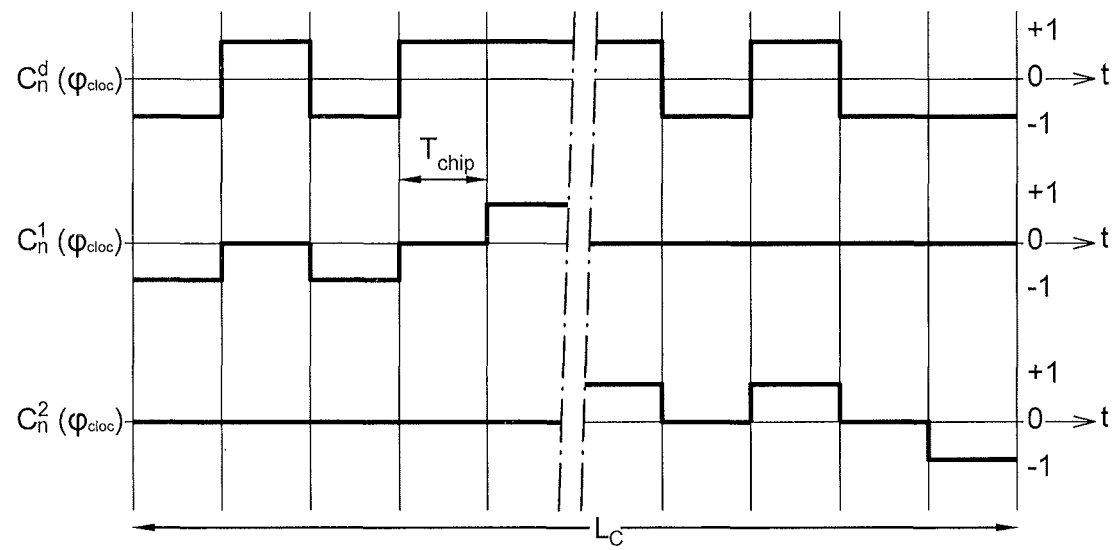

An example of the three spreading codes $C_n^1(\phi_{cloc})$, $C_n^2(\phi_{cloc})$, $C_n^d(\phi_{cloc})$ according to this alternative embodiment is illustrated in FIG. 7.

When the received signal $S_r$ is of the complex type, the first and second test spreading codes $C_n^1(\phi_{cloc})$, $C_n^2(\phi_{cloc})$ correspond to the local data $C_n^1(\phi_{cloc})$ and pilot $C_n^P(\phi_{cloc})$ spreading codes, respectively.

Figure 8:
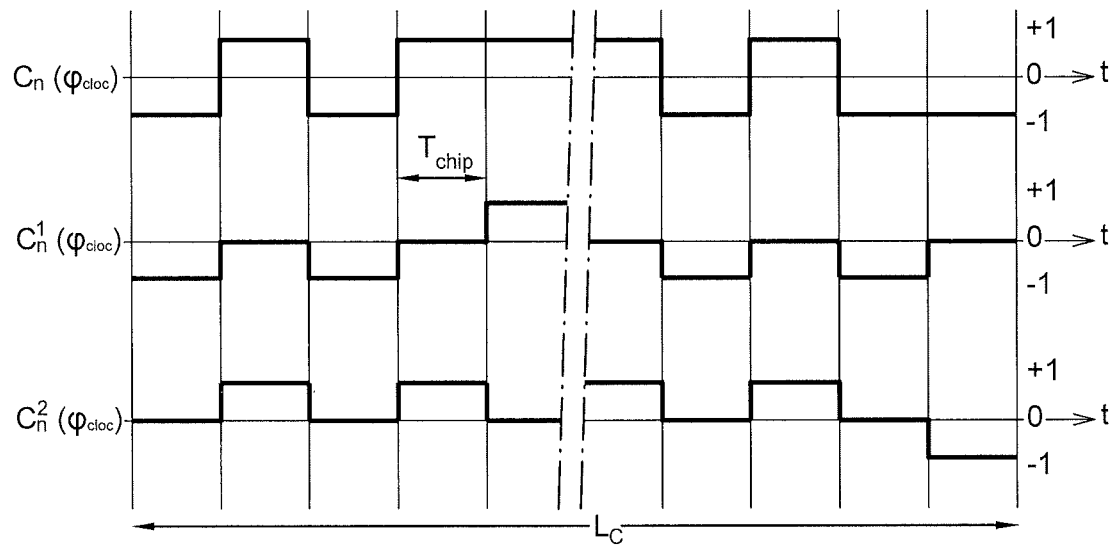
FIGS. 8 and 9 are schematic views illustrating spreading codes used during the implementation of the method of FIG. 5 for a complex signal.

FIG. 8 illustrates an example of the test spreading codes $C_n^1(\phi_{cloc})$, $C_n^2(\phi_{cloc})$ and a composite spreading code $C_n(\phi_{cloc})$ corresponding to the sum of these codes for a complex signal sent using the TDMA technique.

Figure 9:
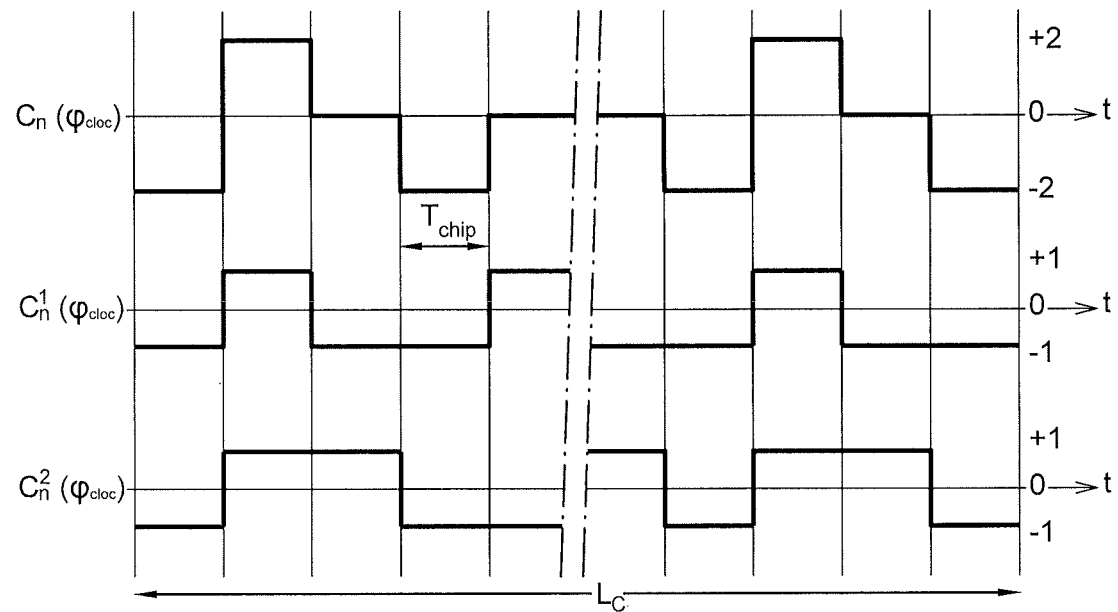

FIG. 9 illustrates an example of the test spreading codes $C_n^1(\phi_{cloc})$, $C_n^2(\phi_{cloc})$ and a composite spreading code $C_n(\phi_{cloc})$ corresponding to the sum of these codes for a complex signal sent using the CDMA technique.

The following steps 115 and 120 are carried out in parallel, during the convergence phase. The steps 135, 140, 150 and 160 are carried out consecutively at the end of the convergence phase.

During step 115, the detection module 28 determines a plurality of correlation intervals.

Each correlation interval is subsequently identified by the index k varying between 1 and $K_{max}$, $K_{max}$ being the total number of correlation intervals over the duration of the convergence phase.

The correlation intervals for example have substantially the same duration T, which is for example equal to 20 ms.

During step 120, for each correlation interval k, the detection module 28 determines a first prompt correlator $Z_p^1(k)$ and a second prompt correlator $Z_p^2(k)$.

In particular, the first prompt correlator $Z_p^1(k)$ corresponds to the correlation value between the received signal $S_r$ and the first test signal $S_T^1$ in the correlation interval k; this correlation value is determined by the following formula:

$$Z_p^1(k) = \frac{1}{T} \int_{kT}^{(k+1)T} S_r(t) S_T^1(t) dt.$$

The second prompt correlator $Z_p^2(k)$ corresponds to the correlation value between the received signal $S_r$ and the second test signal $S_T^2$ in the correlation interval k; this correlation value is determined by the following formula:

$$Z_p^2(k) = \frac{1}{T} \int_{kT}^{(k+1)T} S_r(t) S_T^2(t) dt.$$

During step 135, carried out at the end of the convergence phase, the detection module 28 determines whether it involves a wrong synchronization with a non-zero Doppler value.

To that end, the detection module 28 determines an inconsistency value $V_{inc}$ between the frequency of the local data $C_n^d(\phi_{cloc})$ or pilot $C_n^P(\phi_{cloc})$ spreading code and the frequency of the local carrier $\exp(-j\phi_{ploc})$.

The inconsistency value $V_{inc}$ is determined using the following expression:

$$V_{inc} = \left| c \left[ \frac{F_{cloc}}{F_{cnom}} - \frac{F_{ploc}}{F_{pnom}} \right] \right|,$$

where $F_{cloc} = (\phi_{cloc}(t+\Delta t) - \phi_{cloc}(t))/\Delta t$ is the frequency of the local spreading code;

$F_{ploc} = (\phi_{ploc}(t+\Delta t) - \phi_{ploc}(t))/2\pi/\Delta t$ is the frequency of the local carrier;

$F_{cnom}$ and $F_{pnom}$ are predetermined nominal values of the frequency of the local data $C_n^d(\phi_{cloc})$ or pilot $C_n^P(\phi_{cloc})$ spreading code and the frequency of the local carrier $\exp(-j\phi_{ploc})$, respectively; and c is the speed of light.

In the described example embodiment, corresponding to the GPS L1 C/A signals, the nominal values $F_{cnom}$ and $F_{pnom}$ are chosen as follows:

$$F_{cnom} = 1.023 \text{ MHz}, F_{pnom} = 1575.42 \text{ MHz}.$$

Then, the detection module 28 compares the inconsistency value $V_{inc}$ with a predetermined inconsistency threshold.

When the inconsistency value is above the inconsistency threshold, the detection module 28 determines whether it involves a wrong synchronization with a non-zero Doppler value. In this case, the control module 30 launches the acquisition phase again.

Otherwise, the detection module 28 determines whether it involves a wrong synchronization with a non-zero Doppler value, through the following steps.

In particular, during step 140, the detection module 28 determines a wrong synchronization indicator Ind based on the determined correlators.

During the following step 140, the detection module 28 determines first and second energy values $E_1$ and $E_2$ corresponding to the energy of the first and second correlators $Z_p^1(k)$ and $Z_p^2(k)$, respectively, over all of the correlation intervals.

The energy values $E_1$ and $E_2$ are determined using the following formulas:

$$E_1 = \sum_{k=1,\ldots,K_{max}} \|Z_p^1(k)\|^2, E_1 = \sum_{k=1,\ldots,K_{max}} \|Z_p^2(k)\|^2,$$

where the notation $\|*\|$ indicates a norm.

During the following step 150, the detection module 28 determines a wrong synchronization indicator Ind based on the difference between the first and second energy values $E_1$ and $E_2$, using the following formula:

$$Ind = \frac{|E_2 - E_1|}{E_2 + E_1}.$$

During the following step 160, the detection module compares the indicator Ind with a predetermined threshold $\in$ and detects a wrong synchronization when this indicator Ind is above the threshold $\in$. In this case, the control module 30 launches the acquisition phase again.

Otherwise, the detection module 28 determines that it does not involve a wrong synchronization and the control module 30 launches the tracking phase.

One can then see that the present invention has a certain number of advantages.

Thus, the method according to the invention makes it possible to detect a wrong synchronization very quickly, just after the acquisition phase.

This then makes it possible to avoid the need to acquire ephemerids contained in the item of navigation information and to thus decrease the detection time for a wrong synchronization.

The use of the method is particularly advantageous when satellites are concealed, since the method makes it possible to ensure continuous service.

The particular advantage of the invention lies in the fact that in order to detect a wrong synchronization, it is not necessary to know the specific form of the spreading codes used by the satellites. Indeed, the detection method can be applied to any type of spreading code without any particular adaptation being necessary.

Of course, many other example embodiments of the invention are also possible.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for determining a wrong synchronization of a receiver with a satellite during an acquisition phase of acquiring a navigation signal from said satellite, said satellite being part of a global navigation satellite system, said navigation signal having only one data channel including an item of navigation information modulated by a data spreading code specific to this satellite and carried by a carrier wave;
configuring the receiver during the acquisition phase to receive the navigation signal transmitted by the satellite, and to generate a local image of the data spreading code and a local image of the carrier wave;
the method being implemented after the acquisition phase and before a tracking phase, during a convergence phase and comprising the following steps:
generating a first test signal comprising the local image of the carrier wave and a first test spreading code, and a second test signal comprising the local image of the carrier wave and a second test spreading code;
the first and second test spreading codes being codes whose sum corresponds to the local image of the data spreading code;
for each correlation interval of a plurality of correlation intervals, determining a first prompt correlator corresponding to a correlation value between the received signal and the first test signal, and a second prompt correlator corresponding to a correlation value between the received navigation signal and the second test signal;
determining first and second energy values corresponding to an energy of the first and second prompt correlators, respectively, over all of the correlation intervals;
determining a wrong synchronization indicator based on the difference between the first and second energy values;
determining a wrong synchronization when the wrong synchronization indicator is above a predetermined threshold.

2. The method according to claim 1, wherein the wrong synchronization indicator is determined using the following expression:

$$Ind = \frac{|E_2 - E_1|}{E_2 + E_1},$$

where
$E_1$ is the first energy value; and
$E_2$ is the second energy value.

3. The method according to claim 1, wherein the first energy value corresponds to the sum of the squares of norms of the first correlators over all of the correlation intervals, and the second energy value corresponds to the sum of the squares of norms of the second correlators over all of the correlation intervals.

4. The method according to claim 1, wherein the first and second test spreading codes are decorrelated.

5. The method according to claim 1, wherein the local image of the data spreading code and the first and second test spreading codes each define a code period formed by a plurality of chips, each chip assuming the value of a discretized state from among a set of discretized states, one of these states, called zero state, corresponding to the zero value of this code.

6. The method according to claim 5, wherein:
the period of the first test spreading code is made up of even chips of the local image of the data spreading code, each pair of said chips being spaced apart by a chip whose discretized state corresponds to the zero state; and
the period of the second test spreading code is made up of odd chips of the local image of the data spreading code, each pair of said chips being spaced apart by a chip whose discretized state corresponds to the zero state.

7. The method according to claim 5, wherein:
the first half of the period of the first test spreading code is made up of corresponding chips of the local image of the data spreading code, and the second half is made up of chips whose discretized state corresponds to the zero state;
the first half of the period of the second test spreading code is made up of chips whose discretized state corresponds to the zero state, and the second half is made up of corresponding chips of the local image of the data spreading code.

8. A non-transitory computer program product comprising software instructions which, when implemented by computer equipment, performs the method according to claim 1.

9. A receiver configured to determine a wrong synchronization with a satellite during an acquisition phase for acquiring a navigation signal from this satellite, the satellite being part of a global navigation satellite system, the navigation signal comprising only one data channel including an item of navigation information modulated by a data spreading code specific to this satellite and carried by a carrier wave;
during the acquisition phase, the receiver being configured to receive the navigation signal transmitted by the satellite, and to generate a local image of the data spreading code and a local image of the carrier wave;
the receiver being configured to implement after the acquisition phase a convergence phase;
the receiver comprising a detection module being configured, during the convergence phase, to:
generate a first test signal comprising the local image of the carrier wave and a first test spreading code, and a second test signal comprising the local image of the carrier wave and a second test spreading code;
the first and second test spreading codes being codes whose sum corresponds to the local mage of the data spreading code;
for each correlation interval of a plurality of correlation intervals, determine a first prompt correlator corresponding to a correlation value between the received signal and the first test signal, and a second prompt correlator corresponding to a correlation value between the received navigation signal and the second test signal;
determine first and second energy values corresponding to an energy of the first and second prompt correlators, respectively, over all of the correlation intervals;
determine a wrong synchronization indicator based on the difference between the first and second energy values;
determine a wrong synchronization when the wrong synchronization indicator is above a predetermined threshold.

* * * * *